UNITED STATES PATENT OFFICE.

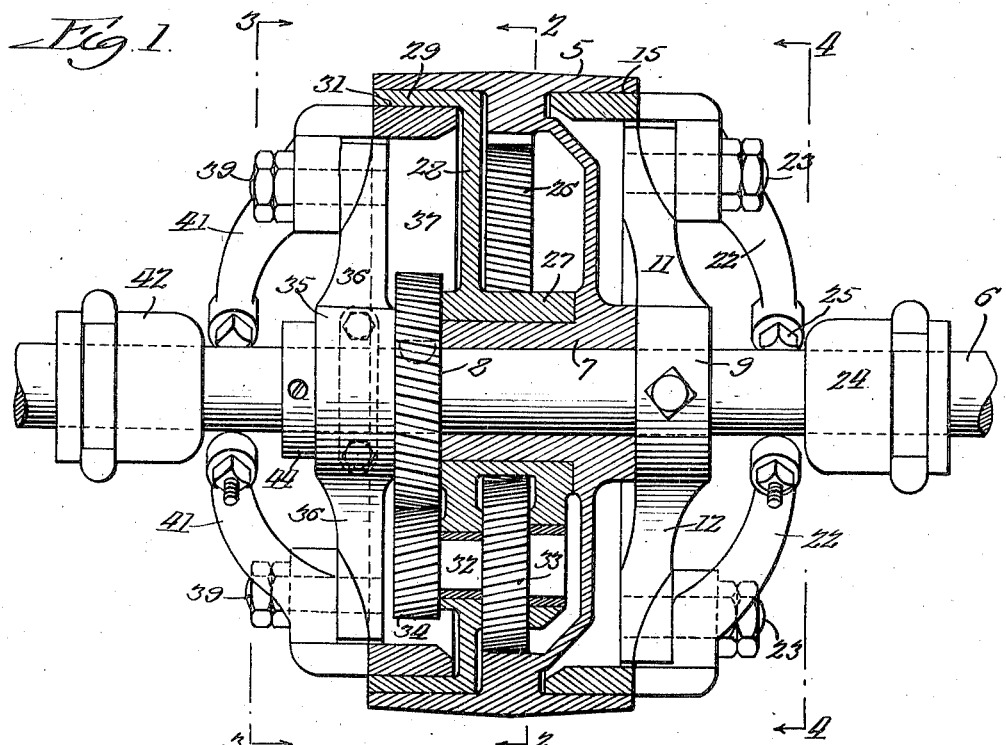

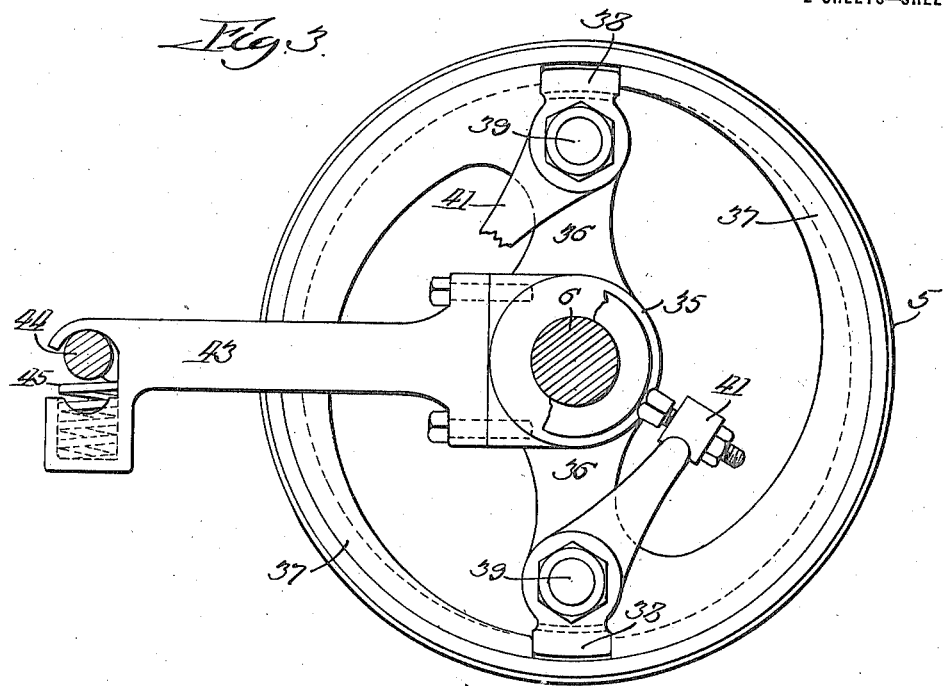

WALTER W. ABITZ, OF ROCKFORD, ILLINOIS, ASSIGNOR TO ROCKFORD METAL SPECIALTY COMPANY, OF ROCKFORD, ILLINOIS, A CORPORATION OF ILLINOIS.

REVERSIBLE GEARING.

1,290,473.      Specification of Letters Patent.      Patented Jan. 7, 1919.

Application filed March 25, 1918. Serial No. 224,488.

*To all whom it may concern:*

Be it known that I, WALTER W. ABITZ, a citizen of the United States, residing at Rockford, in the county of Winnebago and State of Illinois, have invented certain new and useful Improvements in Reversible Gearing, of which the following is a specification.

This invention relates in general to countershaft clutches, and has more particular reference to what might be termed a reversible countershaft clutch pulley. In other words, my improvements have special reference to the provision of means for driving a countershaft in opposite directions through the medium of a belt and pulley driven in one direction. A countershaft clutch pulley of this character is especially adapted for driving lathes, milling machines and various other machines in which it is desired to reverse the direction of drive at will, and which at present are generally driven through the agency of separate belt driven clutches for establishing the forward and reverse speeds.

The primary object of the present invention is to provide a generally improved driving clutch by means of which power from a pulley or other driving member revolved in one direction may be transmitted to a driven shaft in either forward or reverse directions. I have also aimed to provide a pulley clutch of the character mentioned which is so compact and simple that it will occupy but little space on a countershaft and will perform the combined functions of the double-belt clutch pulleys and similar mechanisms now employed for this use.

A further object of my invention is to provide a reverse clutch drive mechanism from which reverse speeds may be obtained from a continuously revolving driving member in a simple and practical manner in which the parts are so designed and constructed as to be most durable and effectual in operation and capable of production at a comparatively low cost.

Other objects and attendant advantages will be appreciated by those familiar with the art as the invention becomes better understood by reference to the following description when considered in connection with the accompanying drawings, in which—

Figure 1 is a longitudinal sectional view through a clutch pulley embodying my improvements; and Figs. 2, 3 and 4, cross-sectional views taken substantially on the lines 2—2, 3—3, and 4—4, respectively of Fig. 1.

In considering this invention, it should be understood that the improvements are not limited to the particular use exemplified in the present illustration, but are adapted as a driving medium for various purposes. It will also be understood to those familiar with the art that while the driving and driven elements are applied as a driving pulley and shaft respectively, the direction of drive might be reversed and also that these elements might take another form different from those illustrated. The driving member, in the form of a belt pulley designated generally by reference character 5, is loosely revoluble about the driven member or shaft 6, which in the present illustration of my improvements may be considered as a countershaft from which any of various machines might be driven. The hub 7 of the driving pulley 5 is confined against lengthwise displacement on the shaft by a gear 8 and a collar 9, respectively fixed to the shaft by any suitable means. Through the agency of a friction clutch coöperable between the driving and driven members, the latter may be connected at will for establishing the direct forward speed. An expanding friction clutch is preferably employed for this purpose and that illustrated in the drawings serves very advantageously the purposes desired. Referring to Figs. 1 and 4, the collar 9 is formed with integral arms 11 and 12 diametrically oppositely disposed and respectively formed with integral shoe sectors 13 and 14. These shoes are shaped to engage the internal face 15 of one flange of the pulley 5 and to constitute expansible members adapted to be expanded at their free ends 16 so as to frictionally engage the pulley. The hub 9, arms 12 and shoes 13 and 14 are preferably in the form of a single casting of suitable metal allowing the shoes proper resiliency, it being observed that the shoes are provided with tapering flanges 17, proportional to the resiliency of the shoes. Interposed between the opposed surfaces 18 and 19, or in other words, the fixed and flexible ends respectively, of the adjoining shoes, is an expander 21 adapted to be rocked for expanding the shoes and consequently, frictionally engaging them with the pulley 5. The expanders 12 are respectively formed integral with arms 22 pivotally mounted upon bolts 23 carried by the arms 11 and 12. These arms 22 extend inwardly and are adapted to be actuated at their inner ends by a cone shifter 24 adapted to be moved lengthwise on the shaft 5 by a suitable shifter lever, not shown. The arms 22 carry at their inner ends adjustable set screws 25, the heads of which are directly actuated by the shifter 24 and are adjustable so as to enable the frictional engagement to be determined to a nicety and also to enable proper adjustment for wear. It will be manifest viewing Figs. 1 and 4 and assuming the pulley to be continuously driven in a counter-clockwise direction, that when the shifter 24 is moved inwardly the arms 22 will be rocked thereby so as to expand and frictionally engage the shoes 13 and 14 with the pulley to establish direct driving connection between the latter and the shaft 6.

The means for transmitting drive from the pulley to the shaft in the reverse direction will now be described. Referring to Figs. 1 and 2, it will be noted that the pulley 5 is shaped to provide a centrally disposed internal spiral gear 26, and that the hub 7 of the pulley is shaped to receive the hub 27 of a disk 28 having a circumferential flange 29 providing an internal face 31 adapted to be frictionally engaged by expansible elements of a friction clutch to be presently mentioned. A disk member 28, revoluble freely upon the hub 7 of the pulley carries a freely revoluble shaft 32 to which is fixed a spiral gear 33 in mesh with the internal gear 26 and a second spiral gear 34 in mesh with the spiral gear 8 which is fixed to the shaft 6. Referring now to the function of the epicyclic train of gearing just described, it will be seen that when the pulley 5 is revolved and the shaft 6 stationary the gears 33 and 34 together with the clutch member 8 will revolve about the shaft 6 and gear 8 at a slower speed than that of the pulley. When, however, the member 28 is retarded the rotative movement of the pulley 5 will be transmitted to the gear 8 in a reverse direction through the agency of the gears 33 and 34. Upon holding the member 28 stationary the shaft 6 will be driven in the reverse direction at a speed proportional to the gear ration of the epicyclic train of gearing employed. In the present instance, the ratio is about 15 to 17, that is, for every 15 revolutions of the pulley 5 the shaft 6 will be revolved in a reverse direction 17 times.

The means for establishing the reverse direction of drive by holding the member 28 stationary consists preferably of an expansible friction clutch very much similar to the clutch described above with reference to the forward direction of drive. This clutch, illustrated in Figs. 1 and 3, is similar in construction to the clutch described above as regards the collar 35, arms 36, expansible shoes 37, and expanders 38 pivoted at 39 and adapted to be actuated by arms 41 through the agency of a cone shifter 42. This clutch is different from the first in that the collar 35 is loose on the shaft 6 and held against rotative movement thereon by an arm 43 connected to a suitable fixed part. A collar 44 fixed to the shaft 6 prevents axial displacement of the collar 35. When the cone shifter 42 is moved inwardly to engage the clutch for expanding the shoes 37 and frictionally engaging them with the internal face 31 of the member 28, the latter member and consequently the gears 33 and 34, will be held stationary with the collar 35 and arm 43, thereby establishing a reverse direction of drive as mentioned above. The reversal in driving direction is plainly seen by reference to Fig. 2, from which it will be noted that the pulley 5 is driven in a counter-clockwise direction, which will revolve the gears 33 and 34, the common axis of which is stationary, in a similar direction and the gear 8 in a clockwise direction. Inasmuch as the tendency of the arm 43 is to revolve with the drive pulley 5 when the reverse clutch is engaged and that said arm is associated at its outer end with a rod 44, which in this instance, is the clutch shifter rod and subject to rattle and vibration in its bearings, I have provided a yielding connection between the arm 43 and the shaft 34, so that any varying resistance to the driven shaft during operation will be effectually cushioned by the spring 45 employed in said yielding connection. In other words, when the reverse speed clutch is engaged the tendency of the arm 43 will be to swing upwardly, and this movement is cushioned by the spring 45 seated in a socket formed in the end of said arm. When the pulley is running idle and also when the forward speed clutch is engaged, the arm 43 simply rests idle on the bar 44. It will be understood that the arm 43 might be attached to any fixed part, the shifter rod 44 being preferably employed, because in countershaft constructions this rod is positioned at uniform distance from and parallel to the countershaft.

Considering now the general operation, it will be plainly understood from the foregoing that when both clutches are disengaged the shaft 6 remains idle and the gears 33 and 34 and the member 28 revolve about the shaft at a slower speed than that of the pulley, and the remaining parts are stationary. When it is desired to drive the shaft 6 forwardly, that is, in the same direction as that of the driving pulley 5, the cone shifter 24 is moved in, thereby engaging the adjacent friction clutch and establishing a direct driving connection between the driving pulley and shaft. During this direct forward speed, all of the parts, with the exception of those connected to and carried by the arms 36, revolve together as a unit, because the collar 9 and gear 8 are both fixed to the drive shaft. To establish the reverse speed drive, the shifter 24 will be disengaged and the shifter 42 engaged, whereby the member 28 will be held stationary so that the gears 33 and 34 revolve about a common stationary axis and the rotative movement of the driving pulley 5 is transmitted through said gears 33 and 34 to the gear 8 in a reverse direction. By reason of this arrangement, the shifter cones 24 and 42 may be operated from a common shifter rod 44 in the same manner as the ordinary separately driven forward and reverse clutches are operated. The present construction, however, enables both forward and reverse driving from a single belt turning in one direction, thus eliminating an extra belt, pulley and appurtenant parts and effecting a substantial saving in space on the shafting. The construction, moreover, is exceedingly simple and yet so designed as to be capable of embodiment in such form as to be thoroughly practical and durable for all conditions and exigencies of service.

While I have shown and described my improvements as relating particularly to a reversible countershaft clutch, it should be understood that this is simply one illustration of my improvements and in no way limiting its use. It will be understood, therefore, that various changes in the construction and arrangement might be made without departing from the spirit and scope of the invention as expressed in the appended claims.

I claim:

1. A driving mechanism of the character described comprising a driving member continuously revolved in one direction, a driven shaft about which the driving member revolves, a gear fixed to the driven shaft, a train of epicyclic gearing between said gear and the driving member, a gear-carrying member in connection with said epicyclic gearing loosely revoluble about the shaft and constituting one element of a friction clutch, a member loose on the shaft and carrying a shoe adapted to frictionally engage said gear-carrying member, and means for holding said friction shoe-carrying member against rotation about the driven shaft consisting of an outwardly extending arm cooperable at its outer end with a fixed part through the agency of a spring so that when the friction clutch is engaged to revolve the driven shaft from and in a direction opposite to that of the driving member through said epicyclic train of gearing, the tendency of said arm to revolve about the driven shaft will be opposed and cushioned by said spring.

2. The combination of a driven shaft, a driving member revoluble about the shaft and having an internal gear and a lateral flange on each side of the gear, an expansible friction shoe coöperable with one of the flanges of the driving member for connecting the latter at will to the driven shaft to establish a driving connection in one direction, a gear-carrying member loosely revoluble about the shaft and having a lateral flange disposed within the other lateral flange of the driving member, a gear fixed to the driven shaft, connected gears carried by said gear-carrying member and in mesh with said internal gear and the gear fixed to the driven shaft, and an expansible friction shoe coöperable with the lateral flange of said member for holding the latter stationary at will to establish the reverse direction of drive.

3. A driving mechanism of the character described comprising a driven shaft, a driving member having a hub revoluble about the shaft and having an internal gear, a clutch for connecting said member to the shaft for directly driving the latter, a gear-carrying member having a hub loosely revoluble upon the hub of the driving member and having a pair of longitudinally spaced and alined bearings, a stub mounted in said bearings and carrying a fixed gear intermediate the same and in mesh with the internal gear on the driving member, a gear fixed to the driven shaft, a second gear fixed to the stub shaft and in mesh with the gear on the driven shaft, and a clutch for holding the gear-carrying member against rotation.

4. A driving mechanism of the character described comprising a driven shaft, a driving member adapted to be continuously revolved about the driven shaft and having an internal gear, a clutch for connecting the driving member to the driven shaft at will, a gear-carrying member loosely revoluble about the shaft and having a radial web and an annular flange extending laterally from said web, a gear fixed to the driven shaft at one side of said gear-carrying member, a stub shaft journaled on and passing through said web and equipped on one side thereof with a gear in mesh with said internal gear and on the opposite side thereof with a gear in mesh with the gear on the driven shaft, said annular flange of the gear-carrying member constituting one element of a friction clutch, and a movable clutch element for frictionally engaging said annular flange for holding the gear-carrying member against rotation.

5. A driving mechanism of the character described comprising a driven shaft, a driving member having a hub revoluble about the driven shaft and having an internal gear, a gear fixed to the driven shaft adjacent to one end of the hub, a clutch member fixed to the driven shaft adjacent to the opposite end of the hub and equipped with movable clutch elements for frictionally engaging the driving member to directly drive the shaft, a gear-carrying member revoluble upon and about the hub of the driving member and equipped with connected gears in mesh with the internal gear and the gear on the shaft, and a clutch for holding the gear-carrying member against rotation.

WALTER W. ABITZ.